Aug. 11, 1931.  F. A. PARSONS  1,818,089
MILLING MACHINE TRANSMISSION
Filed May 9, 1930   2 Sheets-Sheet 2
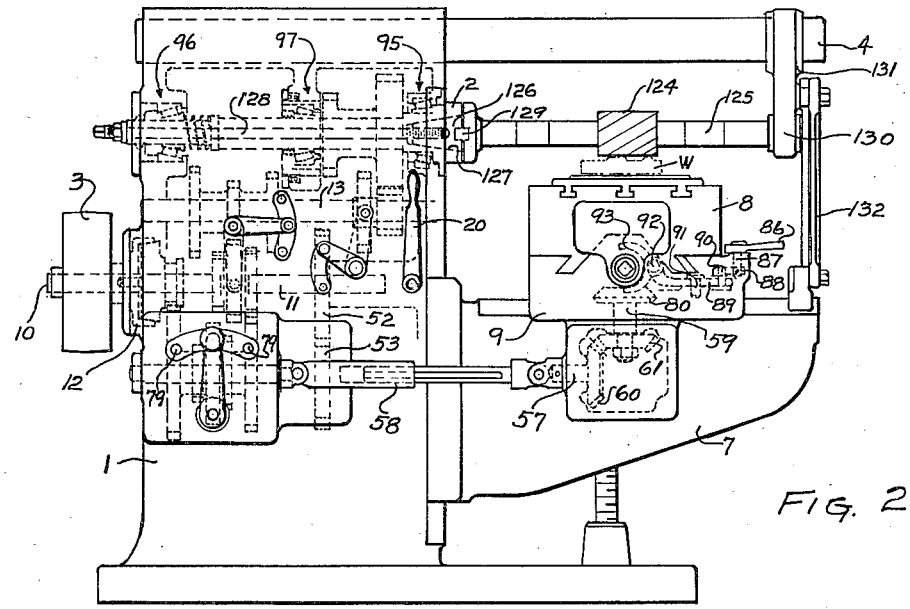
FIG. 2
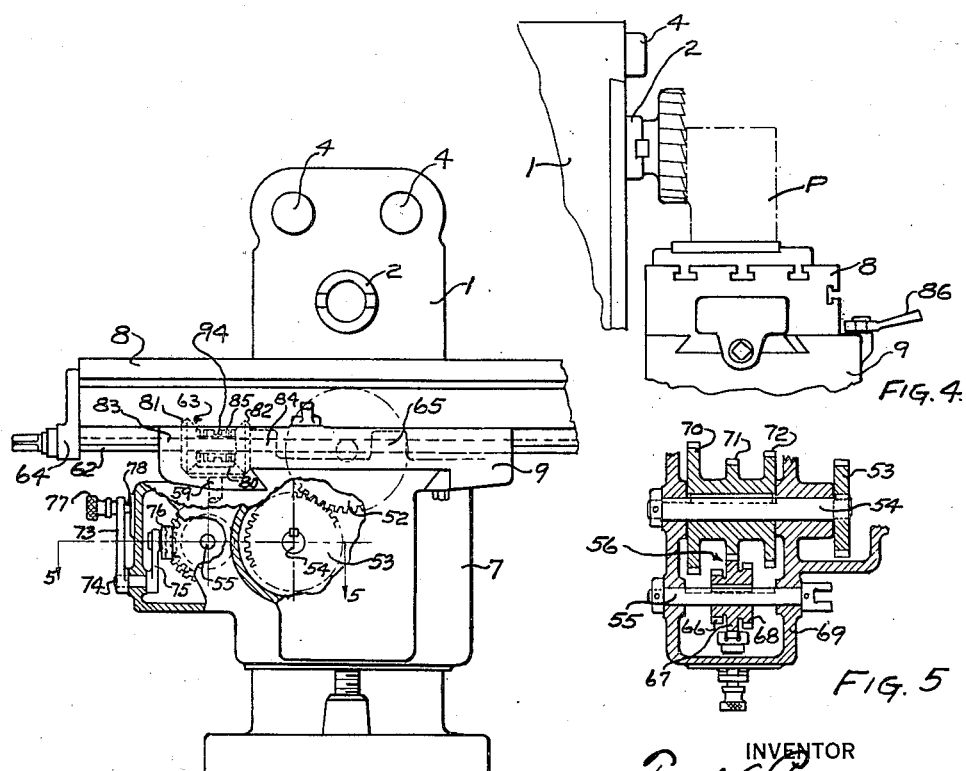
FIG. 3
FIG. 4
FIG. 5
INVENTOR
Fred A. Parsons
BY
ATTORNEY Patented Aug. 11, 1931

1,818,089

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

MILLING MACHINE TRANSMISSION

Application filed May 9, 1930. Serial No. 450,914.

This invention relates to machine tools and more particularly to milling machines.

An object of the invention is to provide improved means for supporting the rotatable spindle of such a machine.

A further object is to provide such means which will cause a minimum of friction.

A further object resides in the provision of means for preventing deflection of such a spindle.

A further object resides in the provision of means for preventing the development of axial looseness between the parts owing to wear or changes of dimensions due to temperature fluctuations.

A further object is to improve the construction and operation of milling machines and of machine tools generally and still other objects and advantages will be apparent from this specification.

The invention consists in the construction and combination of parts as herein illustrated, described and claimed and in such modification of the structure illustrated and described as may be equivalent to the claims.

The same reference characters refer to the same parts throughout the specification and drawings in which:

Fig. 2 is a left side elevation of the same machine with a common type of cutting tool applied thereto.

Fig. 3 is a front elevation of the machine with certain parts removed.

Fig. 4 is a left side view of portions of the machine showing the application of another common type of cutting tool.

Fig. 5 is a horizontal sectional view on the line 5—5 of Fig. 3.

Figure 1:
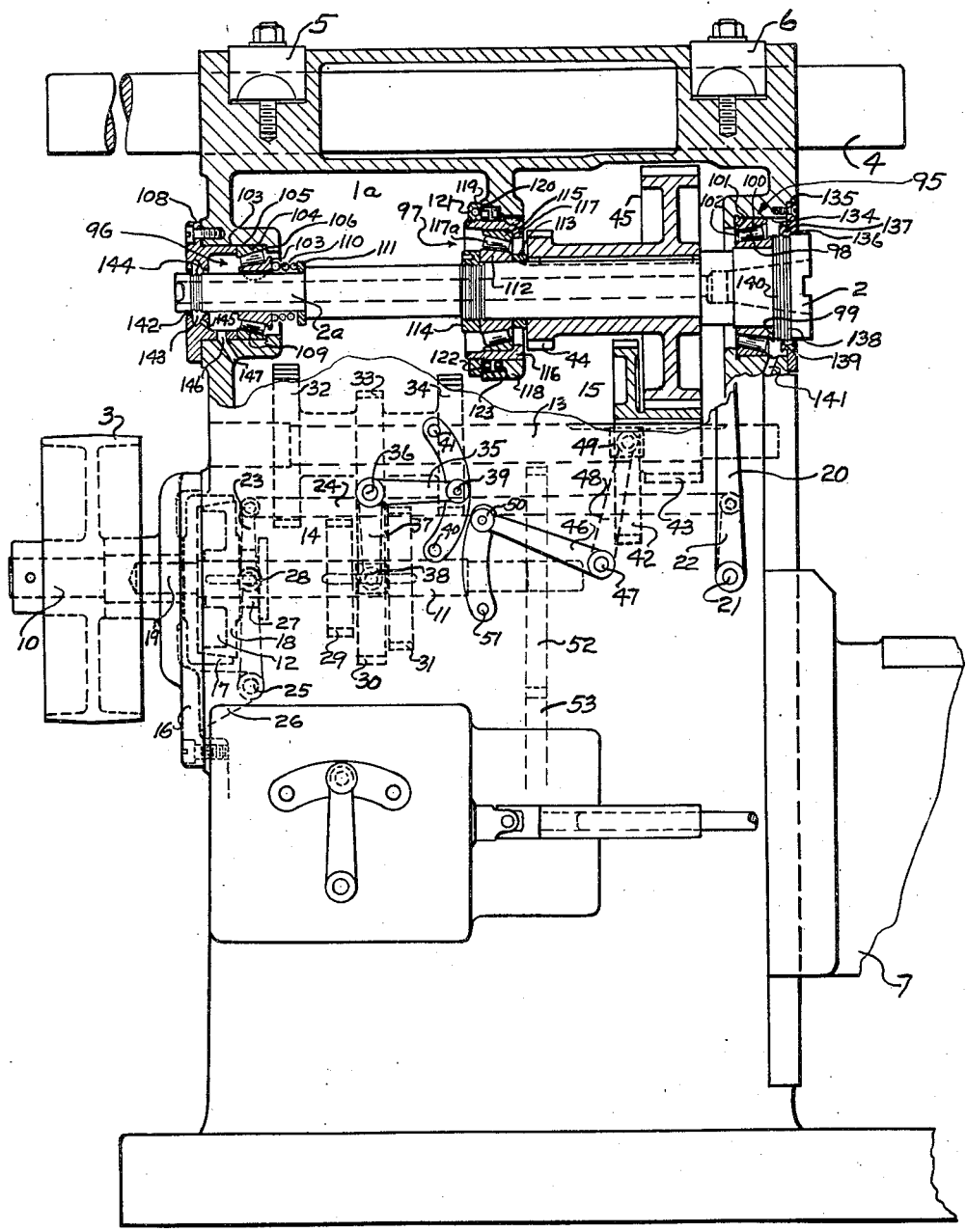
Fig. 1 is a left side view partly in section of a milling machine incorporating the invention.

The milling machine includes a column or housing 1, a tool spindle or tool support 2 rotatably supported from column 1, and a drive pulley 3 constituting a power source for the machine. Overarms 4—4 may be provided supported from column 1 and adjustably fixed therewith by means of clamping members 5 and 6, and a knee or support 7 is slidably guided for vertical adjustment on column 1.

Knee 7 supports a work table or work support 8 for reciprocation in a path at right angles to the axis of spindle 2 by means of a saddle or support 9 horizontally adjustable on knee 7 in a direction parallel to the axis of spindle 2.

The opposite ends of spindle 2 are exposed outside the column and the intermediate portions are enclosed within the box-like housing provided by the walls of the column and forming an interior chamber, generally denoted by the numeral 1a.

Spindle 2 may be driven from pulley 3 by means of the following mechanism: Pulley 3 is fixed on a shaft 10 which in turn drives a shaft 11 by means of a clutch, generally denoted by numeral 12, and shaft 11 drives a shaft 13 through the medium of a rate changer, generally denoted by numeral 14. Shaft 13 drives spindle 2 by means of a rate changer, generally denoted by numeral 15, the rate changers enabling a number of speeds to be obtained in spindle 2 for any given constant rate of pulley 3.

Shaft 10 is journaled in a member 16 fixed with column 1 and is connected at its inner end with a member 17 of clutch 12. Clutch 12 also includes a member 18 slidably keyed with shaft 11 and provided with a surface adapted to frictionally engage a surface on member 17. Shaft 11 has a reduced extension 19 journaled in a suitable bore in member 17 and shaft 10 and serving to keep the two shafts in axial alignment while permitting relative rotary movement thereof. Member 18 may be moved into and out of engagement with member 17 by means of a hand lever 20 fixed with a shaft 21 journaled in a wall of the column and having fixed thereon inside the column a lever 22. Lever 22 actuates a lever 23 by means of a rod 24 pivoted at its ends to levers 22 and 23 respectively. Lever 23 is pivoted on a stud 25 fixed with an extension 26 of member 16 and engages a spool 27 by means of a pivoted shoe 28. Spool 27 is fixed with member 18 and upon movement of lever 23 causes member 18 to move into or out of engagement with member 17, thus starting or stopping the rotation of shaft 11.

Rate changer 14 consists of the gears 29—30—31 fixed together and slidably keyed on shaft 11 and adapted to engage one at a time with gears 32—33—34 fixed with shaft 13. Gears 29—30—31 may be longitudinally shifted by means of a hand lever 35 fixed with a shaft 36 journaled in a wall of column 1 and having on its inner end a lever 37 provided with a pivoted fork member 38 engaging the side edges of gear 30 whereby movement of lever 35 will cause shifting of gears 29—30—31. Lever 35 is provided with a handle 39 having a spring-pressed pin engaging holes such as 40 and 41 in the wall of column 1 for locking the parts in one or another of their shifted positions.

Rate changer 15 consists of gears 42—43 connected to form a unit slidably keyed on shaft 13 and shiftable to engage one at a time with gears 44—45 respectively, fixed with spindle 2. For shifting these gears a hand lever 46 is provided fixed on a shaft 47 journaled in a wall of the column and having fixed on its inner end a lever 48 having a pivoted member 49 engaging the side edges of gear 42. Movement of lever 46 up or down will accordingly cause translation of gears 42—43 to the right or left, as will be understood, a suitable handle 50 being provided having a spring-pressed pin cooperating with suitable holes such as 51 in the wall of column 1 for holding the parts in shifted position. Through suitable combinations of positions of the rate changers numerous speeds of spindle 2 may be obtained, as will be apparent.

Motion of work table 8 is provided by means of a feed train driven from shaft 11 by means of a gear 52 fixed with shaft 11 and meshing with a gear 53, Figs. 2—3—5, fixed on a shaft 54. Shaft 54 drives a shaft 55 through the medium of a rate changer, generally denoted by numeral 56, and shaft 55 drives a shaft 57 journaled in a suitable bearing on saddle 9 through an extensible universal joint shaft 58. Shaft 57 drives a vertical shaft 59 also journaled in saddle 9 through bevel gears 60—61 fixed with the respective shafts, and shaft 59 drives a table screw 62 through a reversing device, generally denoted by numeral 63, screw 62 being journaled in bearings 64 fixed with table 8, prevented from longitudinally moving therein and engaging a nut portion 65 fixed with saddle 9, whereby rotation of screw 62 will cause translation thereof and of table 8.

Rate changer 56 comprises gears 66—67—68 fixed together and slidably keyed on shaft 55 journaled in a suitable casing 69 fixed with column 1 and engageable one at time with gears 70—71—72 respectively, fixed on shaft 54. For shifting gears 66—67—68 a hand lever 73 is provided fixed on a shaft 74 journaled in a suitable bearing in casing 69 and having fixed therewith a lever 75 carrying a pivoted member 76 engaging the side edges of gear 67, whereby movement of lever 73 will cause sliding movement of gears 66—67—68. Lever 73 is provided with a hand grip 77 and a spring pressed pin 78 engages holes such as 79—79 formed in casing 69 to lock the parts in shifted position.

Reverser 63 comprises a bevel gear 80, Figs. 2 and 3, fixed with vertical shaft 59 and meshing with bevel gears 81—82 rotatably supported from bearings 83—84 fixed with saddle 9 and having axial bores through which table screw 62 is freely slidable. Gears 81 and 82 are accordingly caused to rotate in opposite directions whenever gear 80 is driven. Gears 81—82 have suitable clutch teeth for engagement with clutch teeth formed on a clutch member 85 slidably keyed on table screw 62 between gears 81—82 and selectively engageable therewith by means of a hand lever 86 fixed with a shaft 87 journaled in saddle 9 and having a lever 88 fixed therewith adapted to actuate a lever 89 by means of a pin 90 fixed with lever 88 and engaging a suitable slot in lever 89. Lever 89 is pivoted on a stud 91 fixed with saddle 9 and engaging a rod 92 slidable in saddle 9 and having fixed therewith a fork 93 engaging a groove 94 formed in clutch member 85, whereby movement of lever 86 will cause axial translation of rod 92 and shifting of clutch 85 and consequent rotation of screw 62 and translation of table 8 in one direction or the other according to which of gears 81 and 82 is caused to drive clutch member 85.

The front or tool supporting end of spindle 2 is supported against both lateral and rearward axial movement to the left in Fig. 2 by a bearing, generally denoted by numeral 95, while a bearing, generally denoted by numeral 96, supports the rear end of spindle 2 against lateral displacement. A third bearing, generally denoted by numeral 97, supports the mid-portion of spindle 2 against lateral displacement or deflection and also against forward axial movement.

Bearing 95 comprises an inner annular ring 98 fixed on spindle 2 against a thrust shoulder on abutment 99, an outer annular ring 100 fixed in column 1 against a thrust shoulder or abutment 101 and a number of tapered or cone shaped rollers 102 spaced apart between the rings to roll on the cone ring surface, all in a manner such that rearward axial movement of the spindle tends to take up lost motion between the rings and rolls, and such movement is eventually arrested by thrusts against the respective abutments.

The rear end of the spindle 2 is supported against lateral movement by above mentioned bearing 96 comprising an inner annular ring 103 slidably keyed on a reduced portion 2a of spindle 2, an outer annular ring 104 clamped in a bore 105 in column 1 against a thrust shoulder or abutment 106 by means of an extension portion 107 of a cover plate 108. A number of tapered or cone shaped rollers 109 are spaced apart to roll on cone surfaces of rings 103 and 104. The arrangement is such that rearward axial movement of inner ring 103 tends to take up lost motion between the rings and rolls, and a spring 110, bearing against a washer 111 seated on a suitable shoulder on spindle 2 tends at all times to force such ring in such direction, the strength of the spring being sufficient to normally maintain the parts in their correct working positions.

Bearing 97 comprises an inner annular ring 112 clamped on spindle 2 between a washer 113 abutting against gear 44 and a nut 114 threaded on spindle 2, an outer annular ring 115 fixed in a member 116 and abutting against a shoulder or abutment 117 therein, and a number of tapered rollers 117a spaced apart between the rings to roll on the tapered ring surfaces. Member 116 is slidably keyed in a bracket portion 118 of column 1 and the relation of the parts is such that rearward movement of member 116 tends to take up lost motion between the rings and rolls and to cause rearward axial movement of spindle 2, thereby taking up lost motion in bearing 95, as above described.

Member 116 has a split nut 119 threaded thereon and adapted to abut against a surface 120 on bracket portion 118, whereby suitably tightening the nut will force member 116 rearwardly and tighten both bearings 95 and 97. A screw 121 is provided to tighten nut 119 on member 116 and thereby insure maintenance of the adjustment of nut 119. Nut 119 may accordingly be set up to obtain the desired degree of tightness in bearings 95 and 97 and then locked in position by means of screw 121 whereby the clearance of the bearings may be predetermined at a preferred minimum amount necessary to avoid binding or undue friction of the rollers, or the bearings may be set up to have an initial load if desired.

In order to maintain substantially this initial condition after wear takes place, or other conditions occur which would change it, a spring 122 is provided, enclosed in a suitable recess in bracket portion 118 and acting between an abutment or shoulder 123 formed in bracket portion 118 and nut 119. Normally nut 119 contacts with surface 120 and positively determines the degree of tightness of bearings 95 and 97, but if the parts should wear slightly, or if spindle 2 should expand, owing to temperature conditions, more than column 1, there might result in the absence of spring 122 a certain amount of looseness giving rise to undesirable end play and lateral freedom in spindle 2. Under these conditions spring 122 would expand slightly, taking up the slack and preventing such looseness. Spring 122 is of sufficient strength to resist without yielding any probable axial thrust in a forward direction to which the spindle may be subjected, but, in any case, the nut 119 would prevent more than a slight amount of such movement. Thus bearings 95 and 97 will be maintained at all times in substantially their initial condition of loading and spindle 2 will be supported unyieldingly in its correct position relative to column 1 and the other parts of the machine.

In a milling machine spindle the loads consist normally in lateral and vertical forces tending to displace the front end of the spindle and an axial force in a rearward direction. These arise from the reactions of the cutting tool, as will be understood by reference to Figs. 2 and 4. Fig. 2 shows the machine set up with a cutter 124 mounted on an arbor 125 of suitable type for rotation from spindle 2. Such an arbor would have a tapered shank 126 fitting within a bore 127, Fig. 1, and rigidly held therein by means of a suitable draw bolt 128, Fig. 2, whereby the two members are axially rigid with each other.

Rotation of arbor 125 from spindle 2 is provided for by means of one or more keys 129 engaging suitable slots in spindle 2 and arbor 125. The end of arbor 125 remote from spindle 2 is supported from overarms 4 in a bearing 130 fixed with a pendant 131 clamped with overarms 4 by suitable means, not shown, and braced with knee 7 by means of a harness member 132 of suitable well known form. Arbor 125 is accordingly supported at its ends, but any tendency to bow under the reaction of the work piece W against cutter 124 is resisted not only by the stiffness of arbor 125, but also by that of spindle 2 and its bearings. Thus any tendency of arbor 125 to bend caused by the reaction of the work piece W against cutter 124 will cause a similar but opposite tendency to bend in spindle 2, owing to the rigid connection between the arbor and spindle. Conversely any resistance to bending present in spindle 2 will assist in preventing bending of arbor 125 and bearing 97 being spaced between bearings 95 and 96 and at the point along the axis of the spindle where spindle bending is most effectively resisted will be peculiarly effective in resisting such bowing of spindle 2 and accordingly of arbor 125.

The teeth on a cutter of the type indicated are spiral to a greater or lesser degree and the cutter is normally applied to the arbor in such a way that the end thrust resulting from the angularity of such teeth will be toward the column, as indicated in Fig. 2, but if by mistake or peculiar requirements of certain work the cutter is applied to the arbor in the reversed position, whereby the end thrust will be to the right in Fig. 2, the position of spindle 2 will be maintained by spring 122, as above explained, or by the engagement of nut 119 with shoulder 120 on bracket 118.

Fig. 4 shows the machine set up with a cutter 133 of the type known as a "face mill". With this type of cutter the end thrust is obviously always in a rearward direction, but there is, however, some tendency for bending or deflection of the spindle, and this is most effectually resisted by the bearing 97, as above outlined.

Other spindle moving or deflecting forces arise from the driving train. It will be apparent, for instance, that the force applied to either gear 44 or 45 in order to rotate the cutters will also tend to deflect or bend the spindle, such tendency being in fact a resultant of the bending tendency of both the cutters and the gears. In any event, the position of the bearing 97 is best adapted to resist all such bending since its effect is applied at the point where the deflection is greatest and the necessary opposed resistance is therefore smallest.

Provision is made for preventing entrance of cooling fluid into the column or escape of lubricant from the column at the points where spindle 2 extends outside of column 1 as follows: Bearing 95 is fitted within a bore 134 which is closed in a forward direction by a removable cover plate 135 having a bore 136 through which spindle 2 projects, being closely but rotatably fitted therein. An annular groove or chamber 137 is formed in the bore of cover plate 135 and spindle 2 is provided with annular grooves 138 axially coinciding with such chamber whereby any fluid such as cutter coolant which might otherwise tend to work along the spindle into the interior of the column is stopped at the grooves and thrown off either by gravity or centrifugal force into chamber 137 which is provided, at a lower level, with a channel 139 through which such fluid may drain outside the column.

Other annular grooves 140 are formed on spindle 2 slightly to the rear of cover plate 135 for the purpose of throwing off any fluid such as lubricant which may work along spindle 2 through bearing 95 into bore 136 from which it will be returned to the interior of column 1 through a drain passage 141, thereby preventing wastage of such fluid.

Bearing 96 is fitted in bore 105 which is closed in a rearward direction by above mentioned cover plate 108. A bore 142 is formed in the plate for the accommodation of the rear end of spindle 2 and has an annular chamber 143 formed in bore 142 axially coinciding with annular grooves 144 formed on spindle 2, whereby any lubricant which may work along spindle 2 will be thrown off at grooves 144, either by gravity or centrifugal force and collected in chamber 143 from which it will drain back into the interior of the column through passages 145—146—147.

What is claimed is:

1. In a milling machine, the combination of a hollow housing, a tool spindle rotatably supported from said housing, a work support horizontally disposed and slidably supported from said housing for movement in a direction transverse to the axis of said spindle, a front bearing supported from said housing and carrying a front portion of said tool spindle, a rear bearing supported from said housing and carrying a rear portion of said tool spindle, an intermediate bearing supported from said housing approximately centrally between said front and rear bearings and carrying a mid-portion of said tool spindle, each of said bearings being of anti-friction type, a power source for the machine, and transmission means adapted to drive said tool spindle from said power source, including a gear supported on said spindle between said front and intermediate bearings and within said hollow housing.

2. In a milling machine, the combination of a hollow housing, a tool spindle rotatably supported from said housing, a work support horizontally disposed and slidably supported from said housing for movement in a direction transverse to the axis of said spindle, a front bearing supported from said housing and adapted to maintain the front end of said tool spindle against radial displacement and to maintain said tool spindle against axial movement in one direction, an intermediate bearing supported from said housing approximately centrally between said front and rear bearings and adapted to maintain the mid-portion of said tool spindle against radial displacement and to maintain said tool spindle against axial movement in the opposite direction, a rear bearing supported from said housing and adapted to maintain the rear end of said tool spindle against radial displacement, a power source for the machine, and transmission means for driving said tool spindle from said power source, including a gear supported on said spindle between said front and intermediate bearings and within said hollow housing.

3. In a milling machine, the combination of a hollow housing having a front wall and a rear wall, a tool spindle rotatably supported from said housing, a work support horizontally disposed and slidably supported adjacent said front wall for movement in a direction transverse to the axis of said spindle, a front bearing supported from said front wall and adapted to support the front end of said spindle against radial displacement and against axial displacement in one direction, a rear bearing supported from said rear wall and adapted to support the rear end of said tool spindle against radial displacement, an intermediate bearing supported from said housing approximately centrally between said front and rear bearings and adapted to support the mid-portion of said tool spindle against radial displacement and against axial displacement in the other direction, a power source for the machine, and transmission means for driving said tool spindle from said power source including a rate changer having a plurality of alternatively operable different diametered gears supported on said spindle within said housing and positioned between said front and intermediate bearings.

4. In a milling machine, the combination of a hollow housing having a front wall and a rear wall, a tool spindle rotatably supported from said housing, a horizontal work table slidably supported adjacent said front wall for movement in a direction transverse to the axis of said spindle, a front bearing supported from said front wall and adapted to support the front end of said tool spindle against radial displacement, an intermediate bearing supported from said housing approximately centrally between said front and rear bearings and adapted to maintain the mid-portion of said tool spindle against radial displacement, said front and intermediate bearings being also adapted to maintain said tool spindle against axial movement in a rearward or forward direction respectively, a rear bearing supported from said rear wall and adapted to maintain the rear end of said tool spindle against radial displacement, each of said bearings being of anti-friction type, a power source for the machine, and transmission means adapted to drive said tool spindle from said power source including a rate changer housed within said hollow housing and a gear supported on said spindle between said front and intermediate bearings and adapted to receive power through said rate changer.

5. In a milling machine, the combination of a hollow housing having a front wall and a rear wall, a tool spindle rotatably supported from said housing, a work support supported from said housing for movement in a direction transverse to the axis of said spindle, a front bearing supported from said front wall and adapted to maintain the front end of said tool spindle against radial displacement and against axial displacement in one direction, a rear bearing supported from said rear wall and adapted to maintain the rear end of said tool spindle against radial displacement, an intermediate bearing supported from said housing between said walls and adapted to maintain the mid-portion of said tool spindle against radial deflection and against axial displacement in the other direction, means associated with said spindle and bearings and adapted to simultaneously urge portions of said front and intermediate bearings in opposite directions whereby to predetermine an initial loading of both the last mentioned bearings, a power source for the machine, and transmission mechanism adapted to drive said tool spindle from said power source including a gear supported on said spindle within said housing and between said front and intermediate bearings.

6. In a milling machine, the combination of a hollow housing having a front wall and a rear wall, a tool spindle rotatably supported from said housing, a work support supported from said housing for movement in a direction transverse to the axis of said spindle, a front bearing supported from said front wall and adapted to maintain the front end of said tool spindle against radial displacement and against axial displacement in one direction, a rear bearing supported from said rear wall and adapted to maintain the rear end of said tool spindle against radial displacement, an intermediate bearing supported from said housing between said walls and adapted to maintain the mid-portion of said tool spindle against radial deflection and against axial displacement in the other direction, each of said bearings being of anti-friction type, and automatic means associated with said spindle and bearings and adapted to simultaneously urge portions of said front and intermediate bearings in opposite directions whereby to continuously maintain a predetermined initial loading of both the last mentioned bearings and in spite of wear of the parts or temperature fluctuations, and transmission mechanism for driving said spindle including a rate changer, and a gear within said housing and driven through said rate changer and supported on said spindle between said last mentioned bearings.

7. In a milling machine, the combination of a hollow housing having a front wall and a rear wall, a tool spindle rotatably supported from said housing, a work support adjacent said front wall and movable in a direction transverse to the axis of said spindle, a front bearing supported from said front wall and adapted to maintain the front end of said tool spindle against radial displacement and against axial displacement in one direction, a rear bearing supported from said rear wall and adapted to maintain the rear end of said tool spindle against radial displacement, an intermediate bearing supported from said housing between said walls and adapted to maintain the mid-portion of said tool spindle against radial deflection or axial displacement in the other direction, and automatic means associated with said spindle and bearings and adapted to continuously urge portions of each of said bearings to positions productive of predetermined initial loading whereby to maintain said initial loading in spite of wear or temperature changes, a power source for the machine, transmission means adapted to drive said tool spindle from said power source and including a rate changer and a gear supported on said spindle between said front and intermediate bearings and driven through said rate changer.

8. In a milling machine, the combination of a hollow housing having a front and a rear wall, a horizontal tool spindle rotatably supported from said housing and having a front end exposed outside said front wall and providing an arbor socket, a work support adjacent said front wall and movable in a direction transverse to the axis of said spindle, a cutter arbor seated in said socket for co-axial rotation from said spindle and extending over said work support, a support for the end of said arbor over said work support including an overarm device adjustably supported from said housing for movement in a direction parallel with the axis of said spindle and arbor, bearings for said spindle and arbor including a front spindle bearing associated with said front wall, a rear spindle bearing associated with said rear wall, an intermediate spindle bearing approximately centrally between said front and rear walls and an arbor bearing supported from said overarm device, a cutter fixed on said arbor at a point between said front spindle bearing and said arbor bearing, and a transmission for driving said cutter including a rate changer and a gear within said hollow housing and driven through said rate changer and supported on said spindle at a point between said front and intermediate bearings.

9. In a milling machine, the combination of a hollow column having a front and rear wall, a horizontal tool spindle rotatably supported from said column and having a front end exposed outside said front wall and providing an arbor socket, a knee slidably guided on said front wall for vertical movement, a saddle slidably guided on said knee for movement transverse to said knee movement, a work table slidably guided on said saddle for movement in a direction transverse to said saddle movement and transverse to the axis of said spindle, a cutter arbor seated in said socket for co-axial rotation from said spindle and extending over said table, a support for the end of said arbor over said table including an overarm device adjustably supported from said column for movement in a direction parallel with the axis of said spindle and arbor, bearings for said spindle and arbor including a front spindle bearing associated with said front wall, a rear spindle bearing associated with said rear wall, an intermediate spindle bearing approximately centrally between said front and rear walls and an arbor bearing supported from said overarm device, said spindle bearings being adapted to fix the axial position of said spindle and arbor in either direction, a cutter fixed on said arbor at a point between said front spindle bearing and said arbor bearing, and a transmission for driving said cutter including a rate changer within said hollow column and adapted to actuate said spindle at a point between said front and intermediate bearings.

In witness whereof I have hereto affixed my signature.

FRED A. PARSONS.